United States Patent [19]

Meunier et al.

[11] Patent Number: 4,883,824
[45] Date of Patent: Nov. 28, 1989

[54] MODIFIED PHENOLIC FOAM CATALYSTS AND METHOD

[75] Inventors: Paul J. Meunier, Sarnia; James Lunt, Brights Grove; Edwin J. MacPherson, Sarnia, all of Canada

[73] Assignee: Fiberglas Canada, Inc., Ontario, Canada

[21] Appl. No.: 310,491

[22] Filed: Feb. 9, 1989

Related U.S. Application Data

[63] Continuation of Ser. No. 853,397, Apr. 18, 1986, abandoned.

[51] Int. Cl.$^4$ .............................................. C08J 9/14
[52] U.S. Cl. ..................... 521/88; 252/182.24; 502/169; 502/172; 521/97; 521/117; 521/130; 521/181
[58] Field of Search ..................... 521/88, 97, 117, 130, 521/181; 252/182.24; 502/169, 172

[56] References Cited

U.S. PATENT DOCUMENTS 3,907,723  9/1975  Pretot .
4,396,563  8/1983  Gusmer .
4,478,958  10/1984  Carlson et al. .
4,525,492  6/1985  Rastall et al. .
4,530,939  7/1985  Rickle .................. 521/110
4,546,119  10/1985  Lunt et al. .

FOREIGN PATENT DOCUMENTS 732693   11/1969  Belgium .
0066967  12/1982  European Pat. Off. .
0066968  12/1982  European Pat. Off. .
2292733  6/1976   France .
2329709  5/1977   France .
2529898  1/1984   France .
1510404  5/1978   United Kingdom .
1552447  9/1979   United Kingdom .

Primary Examiner—Morton Foelak
Attorney, Agent, or Firm—Oliff & Berridge

[57] ABSTRACT

The invention relates to the preparation of closed cell phenolic resin foams produced from compositions of phenol-aldehyde resole resins, and the foam products thus prepared. More particularly the present invention relates to the preparation of phenolic resin foams by a method employing a novel modified phenolic foam catalyst. The invention also relates to these modified phenolic foam catalysts which include an aromatic sulphonic acid and resorcinol.

15 Claims, 4 Drawing Sheets

MODIFIED PHENOLIC FOAM CATALYSTS AND METHOD

This is a continuation of application Ser. No. 853,397, filed Apr. 18, 1986, abandoned.

THE BACKGROUND OF THE INVENTION

This invention broadly relates to the preparation of closed cell phenolic resin foams produced from compositions of phenol-aldehyde resole resins, and the foam products thus prepared. More particularly the present invention relates to the preparation of phenolic resin foams by a method employing a novel modified phenolic foam catalyst. The invention also relates to these modified phenolic foam catalyst.

The manufacture of phenolic foams is achieved by intimately mixing a phenolic resin with an acid catalyst, a surface active agent and a blowing agent. The phenolic resins generally used are resoles which, under the influence of an acid catalyst, undergo further condensation to produce an infusible thermoset material. The rate of this condensation or 'cure' is determined by the nature and quantity of acid catalyst and the rate of production and removal of volatile condensation products, such as formaldehyde and water.

Typical acid catalysts used in the manufacture of phenolic resin foams are the aromatic sulfonic acids, such as xylene—toluene sulfonic acids (ULTRA TX—trademark of Witco Chemicals), or phenol sulphonic acid. These acids are generally used in the 10% to 25% level to achieve commercially acceptable cure times in the manufacture of phenolic resin foams. These levels of acid catalysts lead to high exotherm temperatures and a pronounced moisture sensitivity in the final product.

In the manufacture of closed cell phenolic foams, such high exotherm temperatures necessitate the use of pressure during the expansion process to prevent 'rupture' of the cell windows. This bursting of the cells is caused by the high vapour pressures generated by the presence of the blowing agent, along with volatile condensation products, such as water and formaldehyde. Thus Doerge in U.S. Pat. No. 4,423,168 dated Dec. 27, 1983 and entitled "Method of Producing Phenolic Foam Using Pressure and Foam Produced by the Method" discloses a method for making a phenolic foam whereby the phenolic resole resin foamable composition is introduced into a substantially closed volume and foamed under pressure in excess of two pounds per square inch.

In addition, these acid levels induce a degree of moisture sensitivity which creates problems with regard to dimensional and thermal stability of the resultant foam.

The above deficiencies have severely limited the commercial utility of closed cell phenolic foams. Attempts to reduce the peak temperature, and moisture sensitivity by reducing the acid level, as described in European Patent Nos. 006967 and 006968, both to Monsanto, lead to extended set and cure times, making the manufacturing process slow.

Several references of prior art disclose resorcinol as a reactant with the resole resin itself. Among those is the closed cell phenolic foam described in U.S. Pat. No. 4,546,119, dated Oct. 3, 1985 by inventors J. Lunt, E. J. MacPherson and P. J. Meunier, and assigned to the same assignee. This reference discloses a method of making a phenolic foam material by reacting the phenol-formaldehyde resole with resorcinol, urea or both prior to initiating foam formation by acid catalysis.

Canadian Patent No. 859,789 to Pretot, issued Dec. 29, 1970 and entitled, 'Phenolic Resin Foams' discloses a method of manufacture of phenolic foams including the addition of resorcinol to the phenol formaldehyde resin and blowing agent prior to the addition of strong acid which is last. Resorcinol, in this case, was found to reduce the amount of acid required for foam formation.

SUMMARY OF THE INVENTION

In accordance with the present invention there is provided a method of making a closed cell phenolic foam material which comprises mixing a phenol formaldehyde resole resin having free formaldehyde, a surfactant and a blowing agent with a modified acid catalyst consisting eventially of an aromatic acid, a suitable diluent including glycol, particularly diethylene glycol and a phenol compound; and curing the resultant mixture to yield a closed cell phenolic foam.

In one aspect of the present invention the modified phenolic foam catalyst components are each introduced to the phenol formaldehyde resole resin, surfactant and blowing agent mixture in separate streams. Each stream is diluted with a suitable diluent, preferably diethylene glycol.

There is also provided a modified phenolic foam catalyst composed of an aromatic acid, glycol and a dihydric phenol, which is preferably resorcinol.

In accordance with this invention, the use of a modified catalyst enables certain prior art deficiencies to be overcome and, at the same time, leads to commercially acceptable cure times. In particular, the incorporation of a dihydric phenol, including resorcinol into the aromatic acid catalyst glycol mixture, leads to a commercially viable process and leads to a foam product having improved moisture resistance over those disclosed in the Kopper process disclosed in U.S. Pat. No. 4,423,168.

In these prior art disclosures concerning closed cell phenolic foams, the proposed processes rely on the use of large amounts of acid catalysts which stay in the finished foam products and render them moisture sensitive.

In order to overcome some of the limitations of the prior art, we have developed a method of preparing closed cell phenolic foams having an increased rate at which the closed cell phenolic foam cures without causing damage to the foam properties.

Another object of this invention is to speed the rate at which a closed cell phenolic foam reaches peak exotherm temperature without significantly affecting its peak temperature.

DETAILED DESCRIPTION OF THE INVENTION

Figure 1:
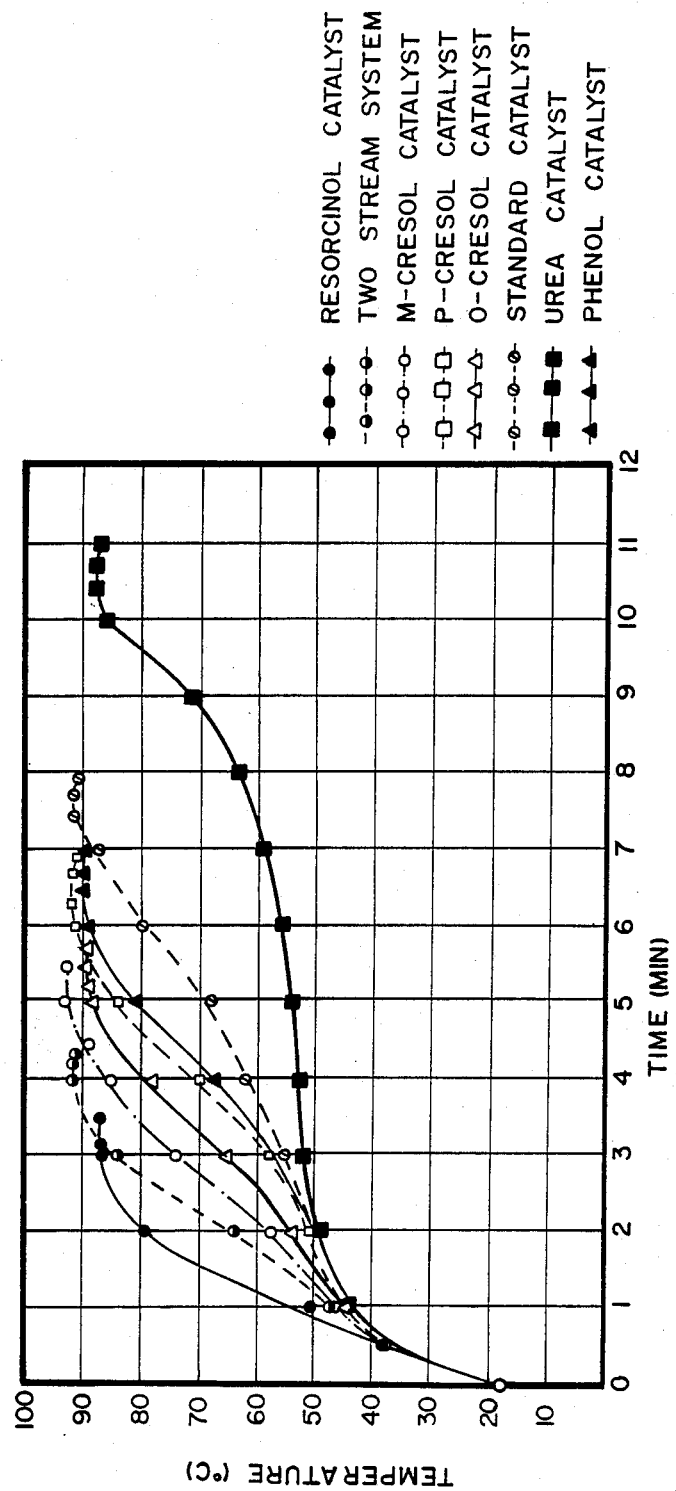
FIG. 1 is a plot of cure exotherms comparing the rate at which the foam reaches peak exotherm for various modified catalyst solutions.

The method of the invention comprises introducing into a phenolic foam resole resin composition comprising phenol-formaldehyde resole resin having free formaldehyde, surfactant and blowing agent, a modified acid catalyst consisting essentially of an aromatic sulfonic acid and a dihydric phenol.

In one embodiment of the present invention, the aromatic acid component and the dihydric phenol component of the modified catalyst are introduced to the phenolic foam resole resin composition in a separate stream.

In practicing the present invention, closed cell phenol formaldehyde foam is prepared by adding the modified acid catalyst of the present invention to an admixture containing a frothable liquid phenol formaldehyde resole resin, a volatile blowing agent for the liquid phenol aldehyde resole resin and a surfactant which is a stabilizing agent for the frothed liquid phenol aldehyde resole resin. A stable uncured froth is produced containing closed cells which have cell walls formed of the liquid resole resin and the closed cells are formed by the liquid blowing agent in gaseous phase. The uncured froth is shaped and then cured by the modified acid catalyst of the present invention.

During the preparation of the phenolic foams, volatiles are produced as a result of the condensation reactions which occur on crosslinking. These volatile materials, which comprise mainly water and formaldehyde must be removed during the post curing process to provide a dimensionally stable product. The temperature at which curing is carried out is selected so as to produce no significant deterioration in closed cell content due to rapid release of these volatiles.

Liquid frothable phenol-aldehyde resole resins suitable for practicing the present invention are well known and the general reaction conditions and variables used in the preparation thereof do not comprise a part of this invention. Numerous patents, including assignee's own U.S. Pat. Nos. 4,525,492 to M. Rastall, N. H. Ng, and E. J. MacPherson, dated June 25, 1985 and entitled "Modified Phenolic Foams", and 4,546,119 to Lunt et al, dated Oct. 8, 1985 and entitled 'Closed Cell Phenolic Foam', and other publications disclose the preparation of liquid resole resins for foam formulations. The disclosures of these two patents are incorporated herein by reference. Examples 3–6 herein (which conform to Examples in the above patents) describe representative preparations of resole resins used in this invention.

Generally, liquid resole resins are prepared by reacting one or more phenols with one or more aldehydes in aqueous phase and in the presence of an alkaline catalyst. Examples of phenols include phenol per se, resorcinol, cresol, xylenol, chlorophenol, bisphenol-A, alpha-naphthol, beta-naphthol, and admixtures thereof. Aldehydes for reaction with the above phenols usually contain about 1–8 carbon atoms and preferably 1–3 carbon atoms. Specific examples include formaldehyde, acetaldehyde, propionic aldehyde, furfural, benzaldehydes and admixtures thereof.

The present invention is preferably directed to the preparation of closed cell foam from frothable liquid resole resins prepared from phenol per se and formaldehyde. The resole resin is preferably stripped of most of its free water. By doing so, the water does not interfere with the production of a closed cell foam.

Blowing agents typically used for phenolic foams are any of the more common FREON blowing agents such as trichlorofluoromethane (sold under the trademark FREON 11), tetrafluoromethane, 1,1,2 - trichloro - 1,2,2 -chlorodifluoroethane, dichlorodifluoromethane, 1,1 -dichloro- 1,2,2,2, - tetrafluoroethane, 1,2 -dichloro1,1,2,2-tetrafluoroethane (FREON 114) and mixtures of these; or chlorinated hydrocarbons, such as methylchloride, chloroform, methylenedichloride, carbontetrachloride and mixtures of these with fluorocarbons, or low boiling hydrocarbons such as propane, butane, pentane, hexane or cyclohexane or low boiling ethers, such as dimethyl, diethyl and dipropyl ether; or ketones such as acetone and methylketone; or low boiling materials, such as carbon disulfide, methyl alcohol, and propyl alcohol, or materials which decompose under the influence of heat to generate nitrogen or another gas "in situ", such as diazo compounds; or materials which liberate carbon dioxide under the influence of acids, such as ammonium carbonate, calcium or sodium carbonate or sodium bicarbonate etc.

The quantity of the blowing agent varies with the type and density of the foam desired.

The surfactant may be any suitable stabilizing agent for use in stabilizing liquid phenol-aldehyde resole resin foams. The prior art describes the use of many types of surfactants which are suitable for use. Nonionic, cationic and even anionic types have been claimed.

Surfactants which are generally used for phenolic foam manufacture are typically non-ionic in nature however. Surfactants containing silicon are widely used, such as the silicon ethylene oxide/propylene oxide copolymers of alkoxy silanes, polysilyl/phosphonates, polydimethylsiloxane, and polyoxyalkylene copolymers. Examples of suitable commercial silicon-containing surfactants are the Dow Corning Trademarks DC-190 and DC-193 and the Union Carbide Trademarks L-530, L-5310 and L-5410. Other non-ionic surfactants are suitable including the Pluronic (trademark of BASF Wyandotte) non-ionic surfactants, particularly the high molecular weight F-127, F-108 and F-98 polyethylene-polypropylene oxides. These, although difficult to disperse, tend to form very stable emulsions with Freons and are quite insoluble in Freons. Polyethylene oxides or polypropylene oxides could also be used.

Surfactant concentrations can vary from 2 to 10% of the total formulation weight. The preferred level for the resoles described herein is 2 to 5%. To produce closed cell foams which contain the blowing agent in sufficient amounts to give superior thermal values, careful selection of resin and surfactant properties is required.

The prior art catalysts employed in the manufacture of phenolic foams are usually acids. Under certain circumstances foam may be generated solely by the application of heat without the use of a catalyst. In practice, however, a catalyst is necessary to complete the curing of the foams, as it is not feasible to do this by heating alone. The cure behavior of phenolic resins is discussed in more detail in chapters 5 and 10 in "The Chemistry of Phenolic Resins" by R. W. Martin, J. Wiley and Sons, Inc., 1956, which is hereby incorporated by reference.

Numerous acid catalysts, both organic and inorganic, are known and disclosed in the prior art. Examples of inorganic acids include hydrochloric acids, sulfuric acids, nitric acid, and the various phosphoric acids. Examples of organic acids include aromatic sulfonic acids, such as benzene sulfonic acid, toluene sulfonic acid, xylene sulfonic acid, phenol sulfonic acid and naphthalene sulfonic acid; latent acid catalysts such as phenol esters of carboxylic acids including phenyl trifluoroacetate and phenyl hydrogen maleate and various sulfur dioxide containing compounds such as the sulfur of a,B-unsaturated ketones and aldehydes and various dienes; mono and poly carboxylic acids such as acetic acid, formic acid, propionic acid, oxalic acid, maleic acid and strong substituted organic acids such as trichloracetic acid. An admixture of toluene sulphonic acid is usually preferred. The acid catalyst sold under the trademark Ultra TX (Witco Chemical Company), the xylene-toluene sulfonic acids are especially preferred. Other acid catalysts of the type are disclosed in U.S. Pat Nos. 4,525,492 and 4,423,163, the disclosures of which are incorporated by reference.

The present invention is directed to modified phenolic foam catalysts. We have found that the addition of a dihydric phenol to the acid catalyst results in an increased rate at which the closed cell phenolic foam reaches peak exotherm temperature without significantly affecting the peak temperature. As well, there is an increase in the rate at which a closed cell phenolic foam cures without causing damage to the foam properties. Thus, the use of such a modified acid catalyst results in a more commercially feasible process and as well, the maintenance of foam properties deficient in the prior art.

These novel modified acid catalysts are useful in making foams from all the acid catalyzed phenolic compositions which are usually employed in the manufacture of such resins. The invention however is particularly directed to the production of foams from phenol formaldehyde resins of the resole type, and will be described in its application to water soluble or partially water soluble phenol formaldehyde resins in which the ratio of phenol to formaldehyde (P/F) is 1:1.5 to 4.5. Gusmer in U.S. Pat. No. 4,396,563 dated Dec. 1, 1981 entitled "Method of Preparing Closed Cell Phenol-Aldehyde and the Closed Cell Foam thus Produced" discloses the preparation of resin having a phenol to formaldehyde mole ratio of 1:1.1 to 3.0. U.S. Pat. No. 4,546,119 to Lunt et al, describes closed cell phenolic foams with a P/F mole ratio of between 1:3 and 1:4.5.

Although the phenol to formaldehyde mole ratios indicated above are preferred and are used to illustrate the present invention, this description does not detract from a more general application to the preparation of acid-catalyzed phenol formaldehyde resin foams in general.

The following preparations and examples describe the manner and process of making the invention and set forth the best mode contemplated by the inventors of carrying out the invention but are not to be construed as limiting.

Example 1 illustrates the various catalyst formulations including the standard (unmodified) catalyst, and various modified phenolic foam catalysts including as a modifying component, resorcinol; m-cresol, p-cresol, o-cresol; phenol, and urea. All catalysts include as the acid component, Ultra TX trademark of Witco Chemical Company which is anhydrous toluene xylene sulfonic acid and a diluent, diethylene glycol.

EXAMPLE 1.

Preparation of Modified Catalyst Formulations

The following catalyst compositions were prepared by mixing the various components shown.

| RESORCINOL CATALYST | | |
|---|---|---|
| Resorcinol | | 35.0 g |
| Diethylene Glycol | | 43.3 |
| Ultra TX | | 21.7 |
| | | 100.0 |
| TWO STREAM RESORCINOL CATALYST SYSTEM | | |
| Stream #1 | Resorcinol | 50.0 g |
| | Diethylene Glycol | 50.0 |
| | | 100.0 |
| Stream #2 | Ultra TX | 73.3 |
| | Diethylene Glycol | 26.7 |
| | | 100.0 |

The two catalyst components were metered separately to mix with separate resin and Freon streams. The catalyst components were used at a ratio of 60% Stream #1, 30% Stream #2.

| M—CRESOL CATALYST | |
|---|---|
| M—Cresol | 35.0 g |
| Diethylene Glycol | 43.3 |
| Ultra TX | 21.7 |
| | 100.0 |
| P—CRESOL CATALYST | |
| P—Cresol | 35.0 g |
| Diethylene Glycol | 43.3 |
| Ultra TX | 21.7 |
| | 100.0 |
| O—CRESOL CATALYST | |
| O—Cresol | 35.0 g |
| Diethylene Glycol | 43.3 |
| Ultra TX | 21.7 |
| | 100.0 |
| UREA CATALYST | |
| Urea | 35.0 g |
| Diethylene Glycol | 43.3 |
| Ultra TX | 21.7 |
| | 100.0 |
| STANDARD CATALYST (UNMODIFIED) | |
| Diethylene Glycol | 66.7 g |
| Ultra TX | 33.3 |
| | 100.0 |
| PHENOL CATALYST | |
| Phenol | 35.0 g |
| Diethylene Glycol | 43.3 |
| Ultra TX | 21.7 |
| | 100.0 |

EXAMPLE 2

Preparation of Resole

A sodium catalysed phenol formaldehyde resole with a phenol to formaldehyde ratio of 1: 1.73 was prepared according to methods known to those skilled in the art using 44% formaldehyde solution. The completed resin was neutralized with acid and stripped in vacuo to remove most of the free water and give a resole with the following properties.

| Viscosity at 25° | 298,000 cps |
|---|---|
| Percent Free Water | 2.75% |
| Wt. Av. Mol. Wt. | 422 |
| No. Av. Mol. Wt. | 170 |
| Z Av. Mol. Wt. | 700 |
| Dispersivity | 2.5 |

A surfactant, Dow Corning DC 193, was added at a level of 3.8% by weight.

Modified catalysts as shown in Example 1 can be utilized to prepare closed cell phenolic foams from the resole. We have found that, the modified catalysts of the present disclosure vary the speed at which a closed cell phenolic foam reaches peak exotherm temperature without having a significant effect on the peak temperature.

In general, the addition of resorcinol, the cresols, or phenol to the acid catalyst resulted in an increase in the rate at which peak exotherm temperature was reached in comparison with the standard (unmodified) catalyst. Conversely, the addition of urea was found of slow the rate of reaction.

To achieve a high degree of closed cell character and thus good thermal properties, we found it necessary for a reaction temperature of 85°-95° C.Z to be reached in a reactivity test of foaming commencing from ambient temperature in a period of between 3 to 6 minutes and preferably 4 minutes. In the case of the resorcinol catalyst, maximum peak temperature was achieved after 3 minutes.

REACTIVITY OF A 1:1.73 P/F RESIN

The reactivity was assessed in the following manner: A mixture of 100g of P/F resole resin and Dow Corning's DC-193 surfactant, was mixed with 14 of Freon 113 as a blowing agent until a stable emulsion was obtained. To the emulsion was added 5.0g of a modified acid catalyst solution selected from those of Example 1 or 3.3g of the standard (unmodified) catalyst solution of Example 1, and the material was stirred until homogeneous.

It should be noted that all catalysts used contained the same acid equivalent of ULTRA TX and diethylene glycol as illustrated in Example 1. Weight differences between the standard and modified catalysts are caused by the addition of the additive.

All samples were foamed in an 8×8×2× steel mold equipped with a thermocouple probe. The mold was heated to 60° C. The samples were cured in a 60° C. oven. All resin samples were used at an initial temperature of 30° C. A thermocouple was used to measure the rate of change in temperature which was recorded on an xy plotter. These plots are shown in FIG. 1.

Typically, the maximum peak temperature achieved for the resole formulations of Example 1 (P/F 1: 1.73) when cured by a modified acid catalyst from an ambient temperature of about 20° C. under these conditions was between 85°-95° C. in 3 to 6 minutes. This method was used to establish changes in the rate at which the foam reached peak exotherm temperature as it relates to the various modified acid catalysts. Comparison of the time-temperature profiles shown in FIG. 1 illustrates that the resorcinol catalyst produced the fastest rate followed closely by the separate stream resorcinol catalyst. The addition of urea slowed the reaction, making it slower than the standard catalyst. It can be seen that generally the addition of a modified catalyst produces foams that reach peak exotherms faster without causing the peak temperature to rise significantly. Also, phenolic foams tend to cure at a faster rate with the addition of a modified catalyst with the exception of urea which slows the reaction.

ADDITIONAL TESTING WITH RESORCINOL CATALYST

The resorcinol catalyst illustrates a great capacity to speed the rate at which the foam reaches peak exotherm temperature without having a significant affect on the peak temperature and therefore cell rupture is minimized. In further testing, the amount of catalyst was altered from 4.0g to 6.0g with the following results:

| Weight of Resorcinol Catalyst | Exotherm |
|---|---|
| 4.0 g | 88.8° C. in 5.75 minutes |
| 5.0 g | 90.0° C. in 4.40 minutes |
| 6.0 g | 96.2° C. in 2.75 minutes |

As can be seen by a comparison of the exotherms produced for the various amounts of catalyst, an increase in the amount of resorcinol catalyst results in a decrease in the time necessary to reach peak exotherm temperature without a significant affect to the peak temperature itself.

It has also been found that foam samples made with the resorcinol catalyst solution retained their properties at lower foam densities. A comparison of closed cell phenolic foams made with the standard catalyst and the resorcinol catalyst are illustrated below. These latter foams were manufactured on a pilot line capable of producing commercial size samples.

| Property | Standard Catalyst 55-2 | Resorcinol Catalyst 60-4 |
|---|---|---|
| Density (lb/ft)$^3$ | 2.55 | 2.30 |
| Percent Closed Cells (ASTM D856) | 95.0 | 94.8 |
| Friability (ASTM C-421) | 4.88 | 5.4 |
| K (Initial) Btu. in (ft. 2 hr. °F.) | 0.107 | 0.103 |
| 'Percent Moisture Absorption | 4.13 | 4.27 |
| pH | 4.67 | 4.31 |

'Water absorption was measured using powdered 1.0 g samples of foam in a weighing dish allowed to stand over water at 25° C. and 80% relative humidity for 24 hours.

Standard Catalyst at Increasing Levels

Figure 2:
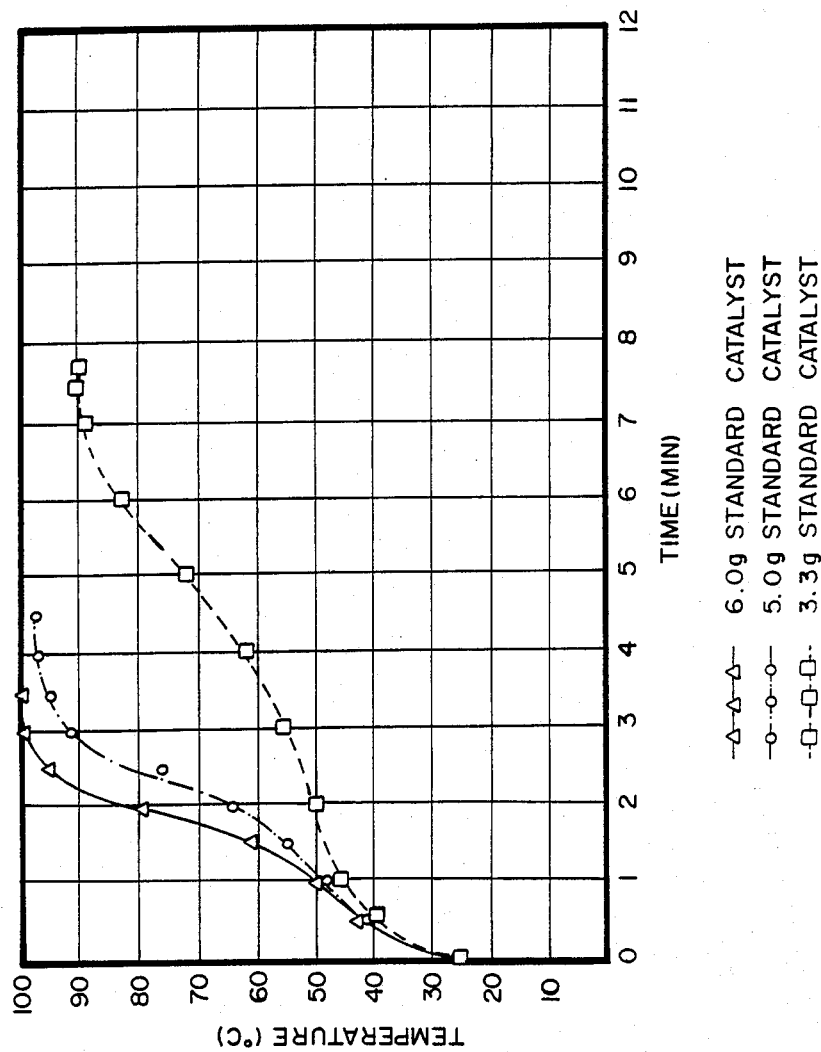
FIG. 2 shows a plot of cure exotherms illustrating the rate at which the foam reaches peak exotherm temperature for various amounts of the standard catalyst.

The rate at which a closed cell phenolic foam reaches peak exotherm temperature can be decreased by using higher levels of standard catalyst solution as shown in FIG. 2. However, an increase in the amount of standard catalyst solution is also accompanied by an increase of the peak exotherm temperature. The peak temperature could reach levels that could be detrimental to foam properties resulting from a rupture of cells generated by the higher internal pressures reached during the early stages of froth formation.

Resorcinol Catalyst in Different P/F Resins

The use of the resorcinol catalyst in different mole ratio resins produces results similar to those of the 1:1.73 P/F resin. The P/F resin foam formulations below were prepared in accordance with the procedure for preparing the 1:1.73 P/F resin formulation. The resin formulations prepared in this manner had the following proportions and reaction conditions:

| 1: 2.5 P/F Resin Foam Formulation | |
|---|---|
| 1: 2.5 P/F Resin | 96.2 g |
| DC-193 | 3.8 |
| Freon 113 | 14.0 |
| Standard catalyst | 12.0 g |
| and/or resorcinol catalyst | 8.0 g |

| -continued | |
|---|---|
| Oven temperature | 60° C. |
| Resin temperature | 30° C. |

| 1: 3.7 Resin Foam Formulation | |
|---|---|
| 1: 3.7 P/F Resin | 96.2 g |
| DC-193 | 3.8 |
| Freon 113 | 14.0 |
| Standard catalyst | 25.0 g |
| and/or resorcinol catalyst | 12.5 g |
| Oven temperature | 60° C. |
| Resin temperature | 30° C. |

Figure 3:
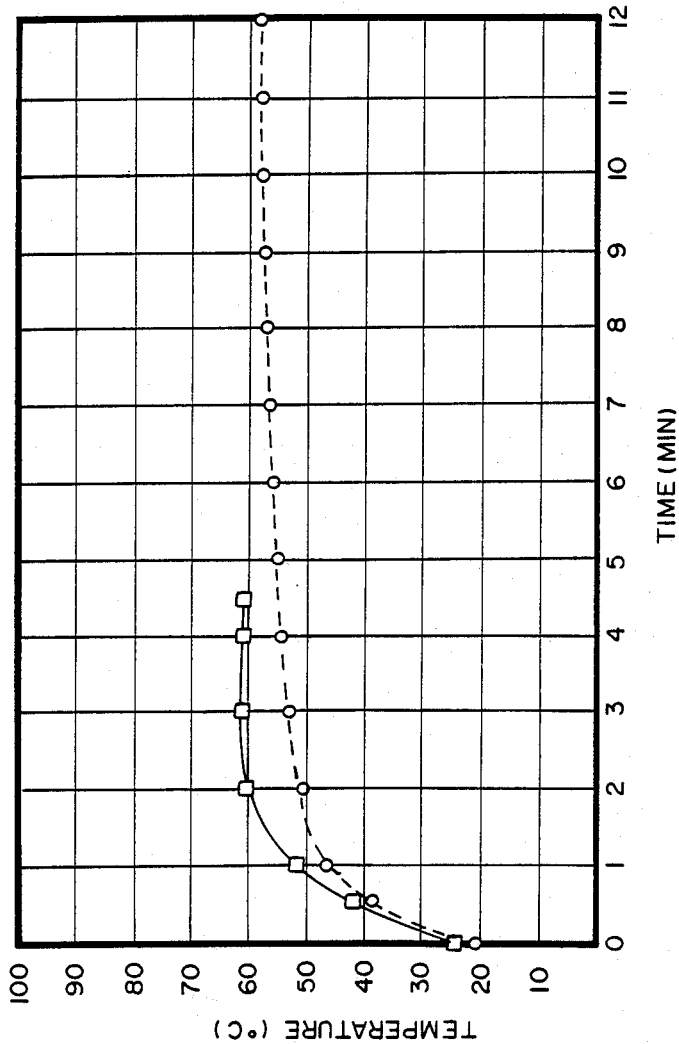
FIG. 3 shows a plot of cure exotherms for the resorcinol catalyst and the standard catalyst in a phenol-formaldehyde resin having a mole ratio 1:2.5. (P/F Resin 1:2.5 Ratio)
Figure 4:
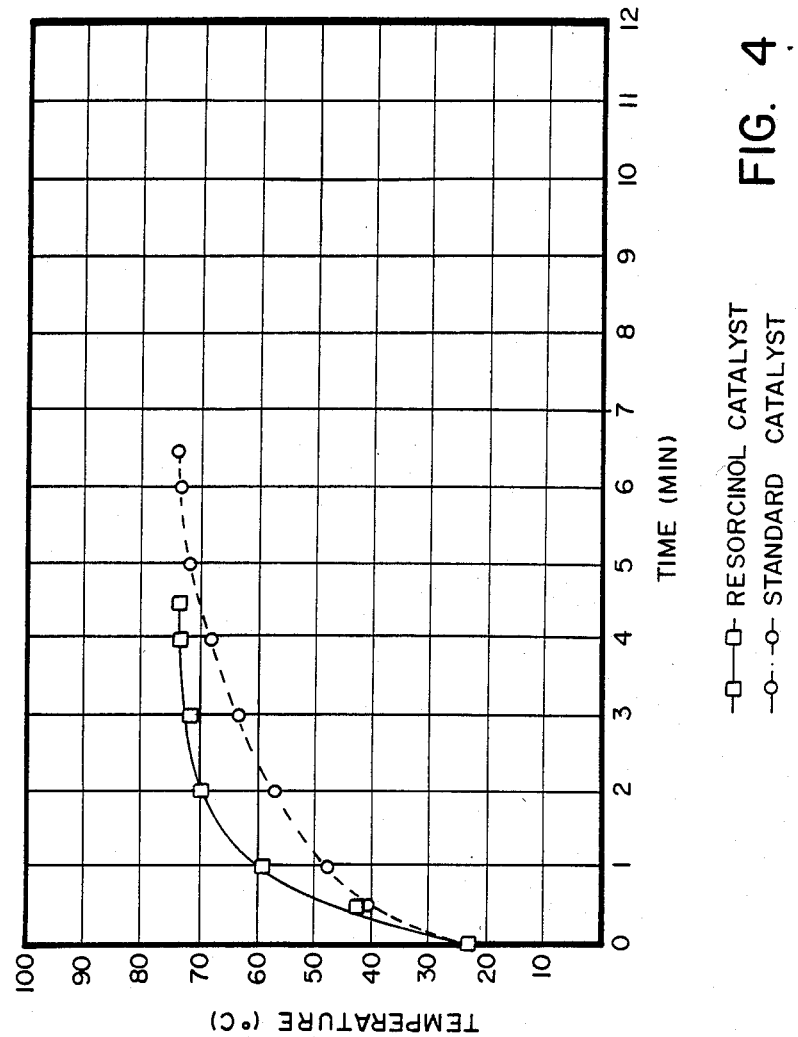
FIG. 4 shows a plot of cure exotherms for the resorcinol catalyst and the standard catalyst in a phenol-formaldehyde resin having a mole ratio of 1:3.7. (P/F Resin 1:3.7 Ratio).

As can be seen from the exotherms shown in Figs. 3 and 4, comparing the results from the addition of the resorcinol catalyst with that of the addition of the standard catalyst, it was seen that the addition of the resorcinol catalyst resulted in an increase in the rate at which the peak exotherm temperature was achieved without an appreciable increase in the peak exotherm temperature for both the 1:2.5 mole ratio and 1: 3.7 mole ratio resin foam formulation.

EXAMPLE 3

A phenol-formaldehyde resole with a phenol to formaldehyde mole ratio of 1:3.2 was prepared by charging a 3 liter reactor, equipped with a stirrer, cooling/heating coil and thermometers with 818.09 g (8.53 m) of 98% phenol and 1860.43 g of 44% formaldehyde (27.3 m). A catalyst solution consisting of 70.84 g of 50% sodium hydroxide solution was added to the mixture over a 15 minute period during which time, the temperature of the reaction was allowed to rise from 40° C. After the addition the mixture was heated at 50° C. When one hour had elapsed, the temperature was raised to 60° C. and held there for a further hour, at which time, the temperature was raised to 70° C. and held there for the remainder of the resole preparation.

The free formaldehyde content of the mixture was monitored throughout the reaction period and when it began to level off at around 7.7%, the mixture was stripped in vacuum at 28" Hg° to remove much of the free water contained in the resole. This high solids resole at pH 9.2 was then cooled and neutralized with 85% phosphoric acid to pH 7.5.

This resole had the following properties:

| | |
|---|---|
| Free formaldehyde | 10.81% |
| Free phenol | 0.1% |
| Solids (150° C. for 2 hours) | 71.13% |
| Viscosity at 20° C. (Brookfield LV4) | 16.300 cps |
| Av. Mol. wt. (Mw) (gel permeation) | 664 |
| Dilutability (in water) | Infinite |
| Gel Time | 465 sec. |

EXAMPLE 4

A phenol-formaldehyde resole with a phenol to formaldehyde mole ratio of 1:3.7 was prepared according to the method described in Canadian Pat. No. 1,092,741, by charging a 3000 gal. reactor with 2234 gal. of 44% formaldehyde and 912 gal. of 98% phenol with stirring. A calcium hydroxide sold by Beachville Chemical at 99% purity (grade #880) was added as catalyst over a period of one hour and 35 minutes.

The temperature at this point was about 86° F. It was held at 86° F. for about 25 minutes and then allowed to rise to 110° F. for about 28 minutes. The temperature was then allowed to rise to 125° F. in 20 minutes and was held there for about 40 minutes. The temperature was then allowed to rise to 150° F. in a 50 minute period and was held there for about 55 minutes until the free formaldehyde had dropped to 8.2%. The mixture was then cooled to 80° F. and the final pH was 8.55.

A resin prepared according to the procedure has the following properties:

| | |
|---|---|
| Organic solids | 44.5% |
| Ash as CaO | 2.03% |
| Free formaldehyde | 8.2% |
| Free phenol | 0.1% |
| pH | 8.55 |
| Gel Time (after neutralization to pH 8.2) | 512 sec. |
| Dilutability | Infinite |

EXAMPLE 5

A phenol-formaldehyde resole with a phenol to formaldehyde mole ratio of 1:3.7 was prepared by charging a 25 gallon reactor equipped with a stirrer, heating-/cooling jacket, condensor and vacuum supply was charged with 50.5 lbs of 98% phenol and 134.5 lbs of 44% formaldehyde. After mixing, the temperature was found to be 32° C. and 4.5 lbs of 50% sodium hydroxide solution was added over a period of 10 minutes, during which period the temperature was allowed to rise to 38° C. It was held at this temperature for a period of one hour and then the temperature was allowed to rise to 43° C. After a further hour, it was allowed to rise to 50° C. and held there for one hour. The temperature was then raised to 63° C. and held there until the free formaldehyde level had dropped to 9%. At this time, vacuum was applied and the material stripped to remove approximately 72 lbs of water and provide a resin with 71.6% total solids, 14.3% free formaldehyde, infinite dilutability and a molecular weight from gel permeation data of MW 448.

EXAMPLE 6

A phenol formaldehyde (P/F) resole resin of P/F charge ratio 1:3.7 was prepared by loading a reactor with 2,235 gallons of 44% aqueous formaldehyde and 912 gallons of USP 98% phenol. The agitator was started and the catalyst, 880 lbs, of calcium hydroxide (99% purity) was metered in over a period of about one hour and thirty five minutes.

The temperature at this point was about 86° F. It was held at 86° F. for about 25 minutes, then the temperature was allowed to rise to 110° F. for about 28 minutes. The temperature was then allowed to rise to 125° F. in 20 minutes and held at 125° F. for about 40 minutes. The temperature was allowed to rise to 150° F. in 50 minutes and held at 150° F. for about 55 minutes until the free formaldehyde content dropped to 8.2%. The mixture was cooled to 80° F. and the final pH was measured as 8.7. Typical properties of this type of resin are given in Table 1.

TABLE I
TYPICAL RESIN PROPERTIES

| | |
|---|---|
| Oven Solids % (2 hrs. @ 150° C.) | 46.0 Min. |
| Ash % (@ 1500° F.) | 1.7 Min. |
| pH 8.7 | |
| % Free Formaldehyde | 8.2–8.8 |

TABLE I-continued

| | |
|---|---|
| Dilutability | Infinite |
| Viscosity (@ 30° C.) | 20 cps |
| Specific Gravity (@ 25° C.) | 1.19 |

| TYPICAL COMPONENT ANALYSIS* | |
|---|---|
| | % |
| Phenol | .34 |
| o-methylol phenol | .51 |
| p-methylol phenol | .55 |
| total mono-methylol phenols | 1.56 |
| total dimethylol phenols | 2.19 |
| total trimethylol phenols | 22.48 |
| total diphenyls | 14.36 |
| heavier components | 2.4 |

The number average molecular weight was found to be 230.
*Data obtained from gas chromatographic analyses of resin sample after silylization with BSTFA, using 2,4-dimethylol-phenol as an internal standard.

The embodiments of the invention in which an exclusive property or privilege is claimed are defined as follows:

1. A method of making a closed cell phenolic foam material which comprises providing a mixture of a phenol formaldehyde resole resin from which most of any free water has been stripped and having a P/F ratio of from about 1:1.5 to 1:4.5, a surfactant and a blowing agent,
   and mixing said mixture with a modified acid catalyst consisting essentially of an aromatic acid, a compound selected from the group consisting of resorcinol, m-cresol, o-cresol and p-cresol, said compound being present in an amount effective to cause a shorter time to peak exotherm than would result if said compound was omitted from said acid catalyst without causing a significant increase in the peak temperature, and a diluent,
   and subsequently curing the resultant mixture to yield a closed cell phenolic foam.

2. The method of claim 1 wherein the modified acid catalyst is introduced into the mixture of resin, surfactant and blowing agent by separate first and second streams, wherein said first stream is comprised of an aromatic acid diluted with a glycol and said second stream is comprised of one of said compounds.

3. The method of claim 1 wherein the aromatic acid is an aromatic sulfonic acid selected from the group consisting of benzene sulfonic acid, toluene sulfonic acid, xylene sulfonic acid, phenol sulfonic acid and naphthalene sulfonic acid.

4. The method of claim 1 wherein the aromatic sulfonic acid is xylene-toluene sulfonic acid .

5. The method of claim 1 wherein the blowing agent is selected from trichlorofluoromethane, tetrafluoromethane, 1,1,2-trichloro-1,2,2 - trifluoroethane, monochlorodifluoromethane, dichlorodifluoromethane, 1,1-dichloro-1,2,2,2-tetrafluoroethane, 1, 2-dichloro 1,1,2,2-tetrafluoroethane, and mixtures thereof.

6. The method of claims 1 wherein the blowing agent is 1,1,2- trichloro -1,2,2-trifluoroethane.

7. The method of claim 1 wherein the surfactant is generally used for phenolic foam manufacture.

8. The method of claim 1 wherein the surfactant is a nonionic silicon containing surfactant, or a polyethylenepolypropylene oxide.

9. The method of claim 1 wherein the nonionic surfactant is a silicon-containing surfactant.

10. The method of claim 1 wherein the P/F mold ratio is 1: 1.73.

11. The method of claim 1 wherein the compound is selected from m-cresol or resorcinol or a mixture thereof.

12. The method of claim 1 wherein the compound is resorcinol.

13. The method of claim 1 wherein the diluent is a glycol, including diethylene glycol.

14. The method of claim 1 wherein the blowing agent is 1,2- dichloro 1,2,2,2- tetrafluoroethane.

15. The method of claim 1 wherein said compound is resorcinol in an amount of about 2% by weight of the resin.

* * * * *